United States Patent [19]
Schäfer et al.

[11] Patent Number: 5,738,782
[45] Date of Patent: Apr. 14, 1998

[54] CLEANING APPARATUS FOR FLUIDS

[75] Inventors: Karl-Heinz Schäfer, Füssen; Alfred Geissler, Pfronten, both of Germany

[73] Assignee: Deckel Maho GmbH, Germany

[21] Appl. No.: 763,398

[22] Filed: Dec. 11, 1996

[30] Foreign Application Priority Data

Dec. 11, 1995 [DE] Germany ............ 295 19 626.2 U

[51] Int. Cl.$^6$ .......................... B01D 21/04; B01D 29/01
[52] U.S. Cl. .................. 210/171; 210/305; 210/312; 210/408; 210/521; 210/526
[58] Field of Search ........................... 210/171, 258, 210/259, 295, 305, 312, 408, 411, 413, 499, 519, 521, 526, 532.1, 538

[56] References Cited

U.S. PATENT DOCUMENTS

| | | | |
|---|---|---|---|
| 1,641,469 | 9/1927 | Baker | 210/305 |
| 2,865,509 | 12/1958 | Harlan | 210/312 |
| 3,716,144 | 2/1973 | Bartlow | 210/499 |
| 3,795,316 | 3/1974 | Wood | 210/312 |
| 4,751,006 | 6/1988 | Becker | 210/774 |
| 4,865,724 | 9/1989 | Brandt et al. | 210/305 |
| 4,992,167 | 2/1991 | Uchiyama | 210/171 |
| 5,167,839 | 12/1992 | Widmer, II et al. | 210/171 |
| 5,433,845 | 7/1995 | Greene et al. | 210/305 |

Primary Examiner—Christopher Upton
Attorney, Agent, or Firm—Baker, Maxham, Jester & Meador

[57] ABSTRACT

Apparatus for cleaning fluids, especially cooling lubricants of machine tools. The apparatus includes a tank having a partition subdividing it into a sedimentation chamber and a clean chamber and having an inlet for the contaminated cooling lubricant and a discharge device for the cleaned cooling lubricant. A filter is mounted between the sedimentation chamber and the clean chamber and a conveyor device is mounted in the sedimentation chamber for removing sedimented particles from the tank. An environmentally safe and low-maintenance cleaning apparatus according to this invention is created by the fact that the sedimentation chamber is subdivided by a partition into an inlet area and a preliminary cleaning area that are connected to each other by a passage in the lower area of the partition. The filter is an edge filter mounted in the partition between the preliminary cleaning area and the clean chamber.

16 Claims, 4 Drawing Sheets

5,738,782

CLEANING APPARATUS FOR FLUIDS

BACKGROUND

1. Field of the Invention

The invention concerns an apparatus for cleaning of fluids, and more particularly for cleaning the cooling lubricants of machine tools.

2. Discussion of the Prior Art

U.S. Pat. No. 4,751,006 discloses a cleaning device of the type of the present invention for the cooling lubricants that are used in machining to cool and lubricate the tools and work pieces and to wash away the shavings. With this cleaning system, a tank is divided by a lengthwise vertical wall into a receiving chamber for the contaminated cooling liquid and a collecting chamber for the cleaned cooling liquid. A trough scraper is mounted in the receiving chamber to remove large deposited particles and convey them to a separate disposal tank. The cooling liquid drawn from the receiving chamber is sent through a pipeline system running along the upper wall of the tank to a heating station and from there to a belt filter mounted above the collecting chamber. The cooling liquid is cleaned in continuous operation of the belt filter and is collected in the collecting chamber below. The belt filter consists of a motor-driven continuous belt with paper filter drawn off a supply roll lying on the top line of the belt. The paper filter is entrained by the continuous belt drive and collected together with the particles of solids deposited on it in a container at the end, while at the same time new filter paper is resupplied from the supply roll. One problem with such cleaning systems consists of the relatively high consumption of filter paper, the high cost of the thermal treatment and conveying the liquid, plus the increased environmental pollution because the soiled paper filter must be disposed of as a special waste.

SUMMARY OF THE INVENTION

An important purpose of this invention is to create an environmentally safe, low maintenance cleaning system for fluids, specifically for cooling lubricants, that will permit a high degree of cleaning in a compact design.

This purpose is achieved according to this invention by the fact that the sedimentation chamber is divided by a partition into an inlet area and a preliminary cleaning area that are connected to each other by a passage in the lower area of the partition. The filter is an edge filter mounted in the partition between the preliminary cleaning area and the clean chamber.

An important advantage of the cleaning device according to this invention consists of the good cleaning effect despite the absence of additional paper filters or nonwoven filters. This permits great cost savings for acquisition, replacement and disposal of filter materials. Furthermore, the cost of maintenance is also lower.

Another advantage is the also automatic liquid circulation achieved due to the equalization of levels between the areas of the tank. This does not require any additional pipelines with intermediate pumps for conveying the cooling liquid between the individual chambers. The liquid flows through the edge filter horizontally over a large area at a low flow rate, thus permitting especially reliable and effective filtration.

For long-term operation and for severely contaminated liquids, it is of great practical importance that impurities adhering to the edge filter can be disposed of easily. For this purpose, a cleaning device that can be operated either manually or automatically is mounted on the edge filter. A filter cleaning device with a simple design consists of a manually operated scraper mechanism comprising a slide that can be moved by a lever arrangement parallel to the edge filter and has two scrapers mounted on it so they are in contact with the triangular rods forming the filter. This arrangement makes it possible to remove deposits from the entire area as needed.

Instead of or in addition to the scraper mechanism, the cleaning device may have a back-washing mechanism mounted on the clean chamber side so the filter edge can be rinsed clean by a medium supplied through the nozzles, for example.

An expedient design of this invention is characterized in that the edge filter consists of several parallel triangular rods with a given distance between them as needed. Due to the distance between the individual triangular rods, the gap width and thus the degree of filtration of the edge filter can be preset. The triangular rods are arranged in an advantageous manner such that the gap formed between them increases cortically in the direction from the preliminary cleaning area to the clean chamber. This results in good flow conditions and the edge filter has a smooth surface on the side facing the preliminary cleaning chamber so it is easy to remove any impurities adhering to it. In addition, sticking of particles in the gap is prevented. A simple method of producing the edge filter involves connecting the triangular rods together by cross bars welded to them.

In an especially advantageous embodiment, the edge filter is designed as an independent component mounted in a matching recess in the partition. This permits easy replacement of the edge filter.

In an advantageous embodiment of this invention, the conveyor device for removing of deposited particles consists of a scraper that runs along the bottom of the tank or container in the preliminary cleaning area and through the inlet area to an external disposal container. This permits joint removal of the particles that have sedimented out in the preliminary cleaning area as well as the solids that have already sedimented in the inlet area of the tank.

The inlet has an inlet distributor mounted above the inlet area so the contaminated cooling lubricant can be introduced through this inlet distributor to calm the inlet flow.

The cleaned cooling liquid is preferably removed with pumps, at least one of which is mounted in the clean chamber. For certain purposes, however, the cleaning effect already achieved in the preliminary cleaning chamber is sufficient, so in this case a pump is also provided in the preliminary cleaning chamber. Thus, for example, the cooling liquid taken from the preliminary cleaning chamber may be sufficient for the external cooling lubricant supply, whereas the specially purified cooling liquid from the clean chamber is used for the coolant supply for tools with internal coolant feed.

BRIEF DESCRIPTION OF THE DRAWING

The objects, advantages and features of this invention will be more readily appreciated from the following detailed description when read in conjunction with the accompanying drawing, in which.

DETAILED DESCRIPTION OF THE PREFERRED EMBODIMENTS

Figure 1:
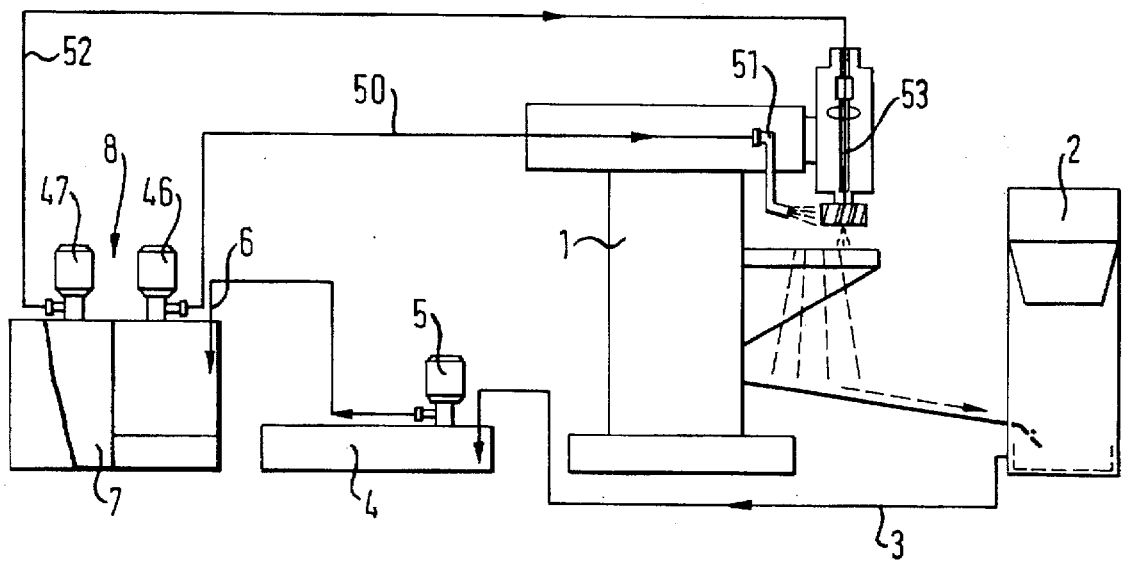
FIG. 1 shows a cooling lubricant circuit of a machine tool with a cleaning device constructed in accordance with the invention.

With the cooling lubricant circuit of machine tool 1 shown in FIG. 1, the contaminated cooling lubricant from machining is sent together with the machining chips to chip conveyor 2 where the large chips are separated from the cooling lubricant and conveyed to a chip container (not shown).

The cooling liquid collected at the bottom of chip conveyor 2 is sent through line 3 to collecting tank 4, from which it is sent by lifting pump 5 to inlet 6 of cleaning apparatus 7. The cooling lubricant is also freed of smaller particles and other soiling in cleaning apparatus 7 and returned to machine tool 1 after cleaning via discharge device 8 with pumps 46 and 47.

Figure 2:
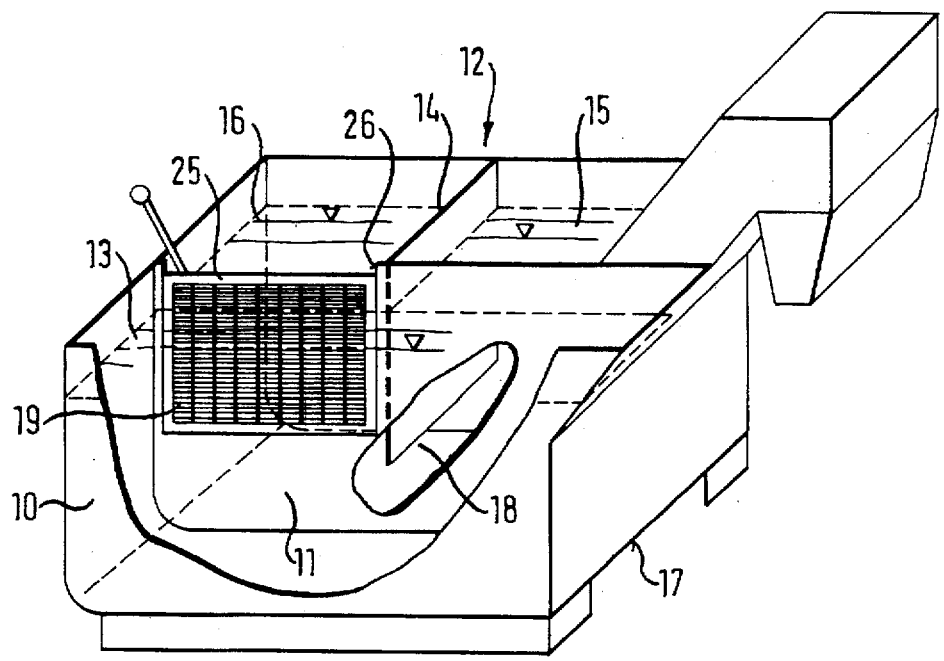
FIG. 2 is a perspective view of the tank of the cleaning device of FIG. 1.
Figure 3:
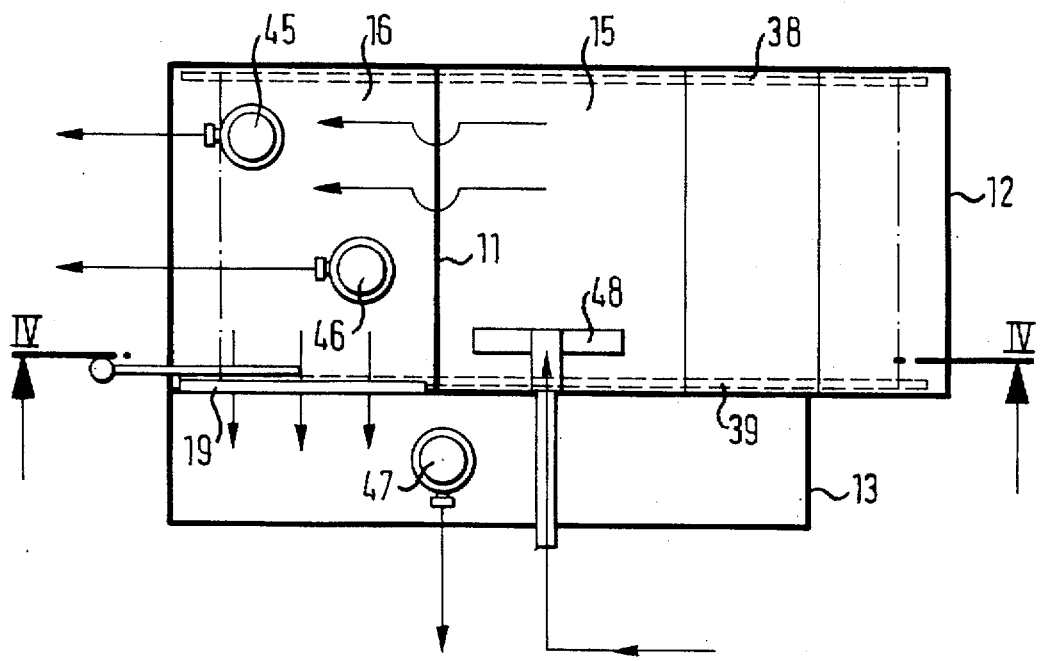
FIG. 3 is a top view of the cleaning device of FIG. 1.
Figure 4:
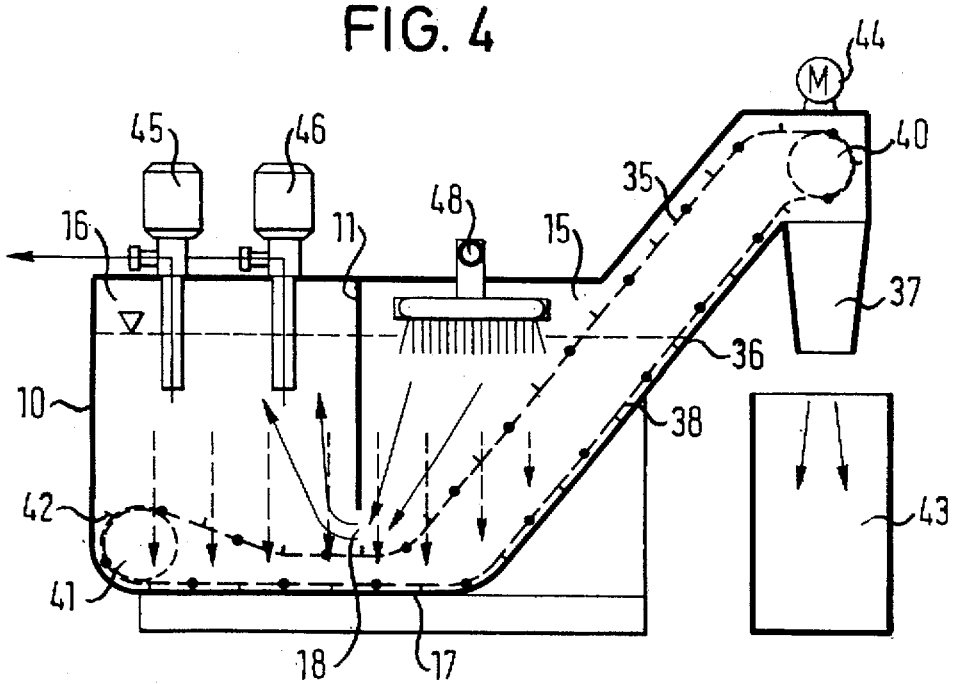
FIG. 4 shows a cross section of the apparatus of FIG. 3, taken along cutting plane IV—IV.

Cleaning apparatus 7 is diagrammed schematically in FIGS. 2 to 4 and includes tank 10, shown in perspective in FIG. 2, having vertical partition 11 running lengthwise and subdividing the tank into large sedimentation chamber 12 and small clean chamber 13 at the side. Sedimentation chamber 12 is divided by vertical partition 14 perpendicular to partition 11 into inlet area 15 and preliminary cleaning area 16. Partition 14 extends to a predetermined distance from bottom 17 of the tank and defines passage 18 between inlet area 15 and preliminary cleaning chamber 16. Edge filter 19 is mounted in partition 11 between preliminary cleaning area 16 and clean chamber 13.

Figure 5:
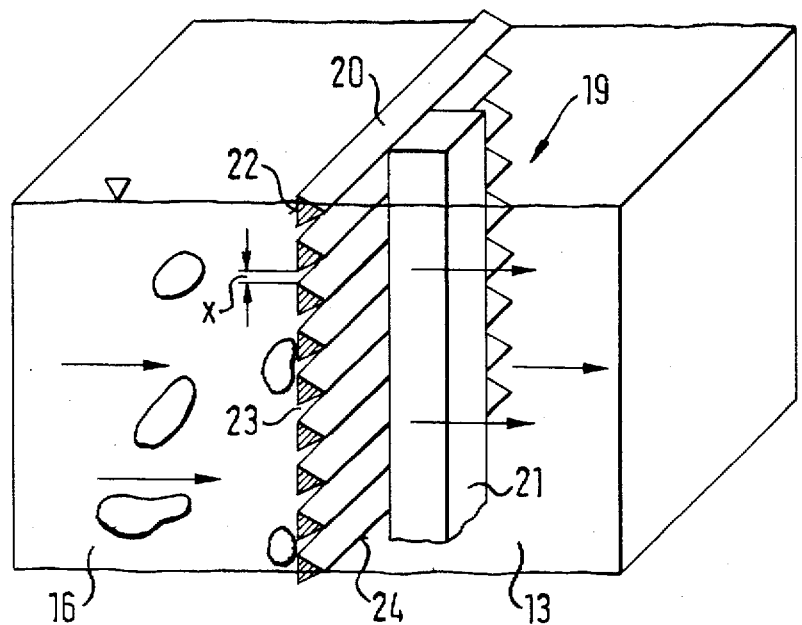
FIG. 5 is a schematic diagram of an edge filter used in the invention.
Figure 6:
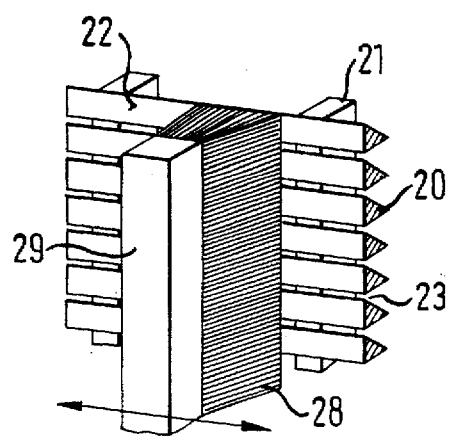
FIG. 6 shows detail VI in FIG. 7.

As shown especially in FIGS. 5 and 6, edge filter 19 consists of several triangular rods 20 arranged parallel to each other with a predetermined distance between them and connected by cross bars 21 on the side facing clean chamber 13. The triangular rods 20 are arranged such that they form a vertical plane facing the preliminary cleaning area 16 on side faces 22. This forms gap passage 23 between each two successive triangular rods, where the passage has its narrowest cross section on the side facing preliminary cleaning area 16 and enlarges conically toward clean chamber 13. At the narrowest point the distance x between two adjacent triangular rods is approximately 50 μm in the embodiment illustrated here. Depending on the degree of cleaning desired in cleaning chamber 13 however, the distance can be varied. The cooling liquid flows through gap passages 23 from preliminary cleaning area 16 into clean chamber 13, while the particles larger than distance x are retained with practically no blockage or sticking in preliminary cleaning area 16. Cross bars 21 have appropriate recesses for the edges 24 of triangular rods 20 and are welded to them. The triangular rods that are connected by cross bars 21 are arranged in frame 25 according to FIG. 2, forming a wedge wire screen that can be inserted into matching recess 26 in partition 11.

Figure 7:
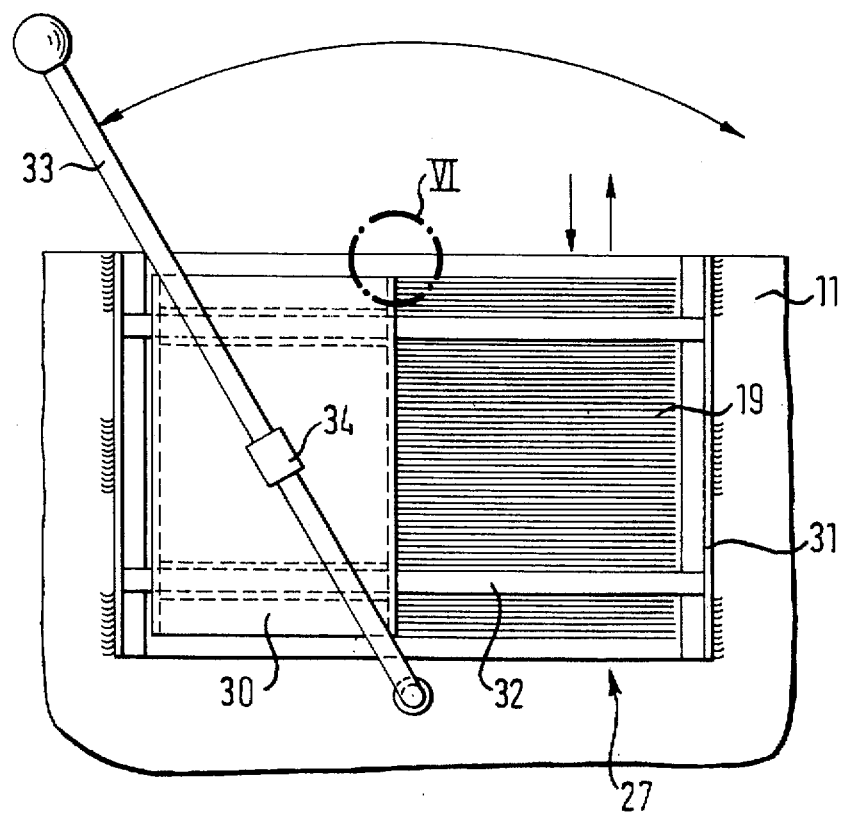
FIG. 7 is a side view of a cleaning device for the edge filter used in the invention.
Figure 8:
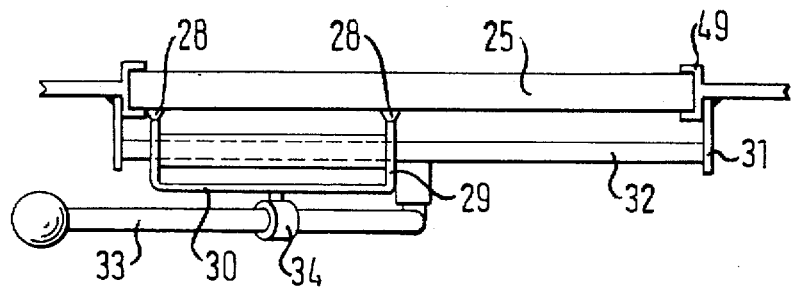
FIG. 8 is a top view of the cleaning device of FIG. 7.

Filter cleaning device 27 (shown separately in FIGS. 7 and 8) is provided on the side of edge filter 19 facing the preliminary cleaning area for removing any impurities that might adhere to the filter. Cleaning device 27 consists of, for example, two scraper elements 28 mounted on two cross beams 29 of slide 30 that can move longitudinally along triangular rods 20 so the scrapers run at right angles to the triangular rods and come in contact with their vertical side faces 22. Slide 30 is guided on two rails 32 welded by cross pieces 31 to partition 11. Operating lever 33 is pivotally-connected to partition 11 at a point below edge filter 19 for shifting scraper 28 along edge filter 19. Guide sleeve 34 is slidably mounted on slide 30 and can be displaced along this lever. By swiveling operating lever 33, slide 30 can be moved back and forth parallel to edge filter 19, so scrapers 28 mounted on the slide move over vertical side faces 22 of the triangular rods and scrape off the filtered out impurities. The edge filter is held with its frame 25 in U-shaped rails 49 on the edge of recess 26 in partition 11 and can be pulled out and reinserted to replace filters or for a general cleaning, as indicated by the arrows in FIG. 7.

As shown especially in FIG. 4, scraper mechanism 35 is mounted in sedimentation chamber 12 to remove the sediment from the inlet and the preliminary cleaning area. This scraper runs inside preliminary cleaning area 16 and through passage 18 on container bottom 17 and through inlet area 15 along sloping discharge surface 36 to discharge chute 37. Scraper 35 consists of two continuous chains 38, 39 arranged parallel to each other and driven in synchronization about motor-driven drive roll 40 on the discharge chute, and guide 41 is mounted close to the container bottom in the preliminary cleaning area. Scraper bars 42 running crosswise are mounted at equal intervals between continuous chains 38, 39. The continuous chains are arranged such that the scraper bars of the lower strand slide just above container bottom 17 and sloping discharge surface 36 when the chain is driven and convey the sediments to discharge chute 37, from which they fall into separate disposal container 43. Scraper 35 is driven by motor 44 in a discontinuous cycle, permitting the wet sediment in the upper area of the discharge surface 36 can dry out, so that the loss of cooling lubricant is greatly reduced. Some of the floating chips and oil collect in the area of the sloping discharge surface and is also entrained by scraper bars 42.

Above preliminary cleaning area 16, two intake pumps 45 and 46 are mounted to remove the precleaned cooling lubricant that has already collected there. Delivery pump 47 to remove the purified cooling liquid collected there is also installed in clean chamber 13.

The embodiment of the cleaning device according to this invention shown in the figures functions as now described. The contaminated cooling lubricant is introduced by means of external lifting pump 5 mounted above collecting tank 4 through inlet distributor 48 mounted above inlet area 15 into tank 10. Inlet distributor 48 is designed as a horizontal cross tube with slots in the sides mounted at the end of an inlet line. For calm inflow, the inlet distributor is preferably mounted between 10 and 200 mm from the surface of the cooling lubricant. Heavy particles settle to the bottom in inlet area 15 and are entrained by scraper 35, so a preliminary purification takes place in this area already. The oil and particles floating at the surface in inlet area 15 are prevented by partition 14 from entering preliminary cleaning area 16. The cooling liquid flows through passage 18 in the lower area of partition 14 into the preliminary cleaning area, where the cooling liquid becomes calm so that even small particles can settle to the bottom. The particles settling at the bottom in the preliminary cleaning area are also entrained by scraper 35 and are conveyed to discharge chute 37, from which the sediments fall into disposal container 43.

The cooling lubricant flows out of preliminary cleaning area 16 through edge filter 19 into clean chamber 13, whereby even finer particles are filtered out. The particles retained by edge filter 19 can settle to the bottom on the preliminary cleaning side, where they are also removed by scraper 35. Particles adhering to the edge filter can be released by cleaning device 27 provided on the edge filter as previously described, and then they also settle to the bottom where they can be removed by scraper 35. The cooling liquid flows from the inlet area 15 through the preliminary cleaning area 16 into clean chamber 13. The flow through the individual areas is produced by the level equalizing effect of liquids and by the suction effect of the pumps.

An adequate degree of cleanliness for external cooling or for flushing chips is achieved in preliminary cleaning area 16. The cooling liquid is removed from the preliminary cleaning area through intake pumps 45 and 46 and is carried through, for example, line 50 to spray nozzles 51, shown in FIG. 1. The cooling liquid with a high degree of cleanliness collected in clean chamber 13 is conveyed through the machining spindle and the tool by delivery pump 47 through inlet line 52 to internal cooling lubricant feed 53.

This invention is not limited to the embodiment described and illustrated here. For example, instead of or in addition to the manually operated scraper mechanism, a rinsing device may also be provided for rinsing out the gaps formed between the triangular wires. Instead of the manual operation, there may be automatic operation that is activated by differences in pressure or level, for example, between the individual chambers. The device according to this invention can be used not only for cleaning cooling lubricants that are used with machine tools but also for processing other liquids and emulsions loaded with solids, for example, in washing stations for automobiles. Additional oil separators may also be provided to remove the excess oil from the container. The inlet distributor designed as a cross pipe with slots at the sides may also be designed in the form of a conical jacket where the contaminated cooling liquid runs along the surfaces. The present invention is to be limited only by the spirit and scope of the appended claims.

What is claimed is:

1. Apparatus for separating contaminants from fluids and comprising:

a tank;

first partition means in said tank for subdividing said tank into a sedimentation chamber and a clean chamber;

inlet means for charging the contaminated fluid into an inlet area in said tank;

discharge apparatus for removing cleaned fluid from at least the clean chamber of the separation apparatus;

a filter mounted between said sedimentation chamber and said clean chamber;

conveyor means coupled in said sedimentation chamber for conveying contaminants from said tank; and second partition means for subdividing said sedimentation chamber into said inlet area and a preliminary cleaning area, which areas are in fluid communication through a passage adjacent the bottom of said tank in said second partition means;

said filter being an edge filter mounted in said first partition means between said preliminary cleaning area and said clean chamber.

2. The apparatus recited in claim 1, and further comprising cleaning means mounted on said edge filter.

3. The apparatus recited in claim 2, wherein said cleaning means selectively comprises a scraper mechanism mounted on the side of said filter facing said preliminary cleaning area, and a back-washing mechanism mounted on the side of said filter facing said clean chamber.

4. The apparatus recited in claim 3, wherein said scraper mechanism comprises a lever arrangement and a slide for moving said scraper mechanism in parallel with said edge filter, said scraper mechanism comprising at least one scraper element mounted on it so that it is in contact with surface of said filter.

5. The apparatus recited in claim 4, wherein said scraper element is a replaceable brush or cleaning strip.

6. The apparatus recited in claim 4 or 5, wherein said lever arrangement comprises an operating lever hinge-connected to said second partition means, and a guide sleeve slidably mounted on said lever.

7. The apparatus recited in claim 6, wherein said scraper mechanism further comprises guide rails arranged parallel to said edge filter and on which said slide moves.

8. The apparatus recited in either claim 4 or 5, wherein said scraper mechanism further comprises guide rails arranged parallel to said edge filter and on which said slide moves.

9. The apparatus recited in claim 1, wherein said edge filter comprises a plurality of parallel triangular rods arranged with a preselected gap between them.

10. The apparatus recited in claim 9, wherein said triangular rods are arranged such that said gap formed between said rods increases in a conical shape from said preliminary cleaning area said to clean chamber.

11. The apparatus recited in claims 9 or 10, wherein said triangular rods are interconnected by cross bars on said clean chamber side of said filter.

12. The apparatus recited in one of claims 1, 2, 3, 4, 5, 9 or 10, wherein said edge filter is replaceable.

13. The apparatus recited in one of claims 1, 2, 3, 4, 5, 9 or 10, wherein said conveyor device comprises a scraper running along the bottom of said tank in said preliminary cleaning area and inclined upwardly through said inlet area to an external disposal container.

14. The apparatus recited in one of claims 1, 2, 3, 4, 5, 9 or 10, wherein said inlet area comprises an inlet having an inlet distributor mounted above said inlet area.

15. The apparatus recited in one of claims 1, 2, 3, 4, 5, 9 or 10, wherein said discharge device comprises at least one delivery pump for pumping the cleaned fluid out of said clean chamber.

16. The apparatus recited in one of claims 1, 2, 3, 4, 5, 9 or 10 wherein said discharge device further comprises at least one intake pump for removing the fluid from said preliminary cleaning area.

* * * * *